United States Patent [19]

Yanagawa

[11] 3,866,755

[45] Feb. 18, 1975

[54] INFORMATION CARD SELECTION AND RETRIEVAL METHOD AND APPARATUS

[75] Inventor: Nobuyuki Yanagawa, Tokyo, Japan

[73] Assignee: Richo Co., Ltd., Tokyo, Japan

[22] Filed: Dec. 28, 1973

[21] Appl. No.: 429,193

[30] Foreign Application Priority Data

Dec. 28, 1972 Japan .............................. 47-130176

[52] U.S. Cl. .............................................. 209/80.5

[51] Int. Cl. .............................................. B07c 3/10

[58] Field of Search .................. 209/80.5, 110.5, 72

[56] References Cited

UNITED STATES PATENTS

| | | | |
|---|---|---|---|
| 2,417,531 | 3/1947 | Welk | 209/110.5 |
| 3,273,567 | 9/1966 | Smitzer | 209/80.5 |
| 3,712,467 | 1/1973 | Barnes | 209/110.5 |
| 3,800,942 | 4/1974 | Hirata et al. | 209/80.5 |

*Primary Examiner*—Allen N. Knowles
*Attorney, Agent, or Firm*—Cooper, Dunham, Clark, Griffin & Moran

[57] ABSTRACT

The selection and retrieval of information cards is facilitated by tilting a cassette containing a number of cards forwardly to a position in which the cards are inclined, with their coded edges facing downwardly. Selector bars cooperate with notches in the coded edges of the cards such that only the card whose notches correspond to selector bars that are in their ON position can be partly pulled out of the cassette. Selector magnets are then brought against the coded edges of the cards and are moved away to partly pull out of the cassette only the card which is not prevented from moving by the selector bars. Since the selected card is moving obliquely downwardly, its frictional drag against the other cards in the cassette is very low. The result is that the cassette can contain a greater number of cards than in the prior art, the selection magnets can have lower strength, and reliability is enhanced.

15 Claims, 23 Drawing Figures

INFORMATION CARD SELECTION AND RETRIEVAL METHOD AND APPARATUS

BACKGROUND OF THE INVENTION

The invention is directed to a method of and an apparatus for electromechanically selecting and retrieving information cards.

Information cards are commonly filed in a file case either horizontally lying on their sides in a stack, or vertically, like the pages of an upstanding book. When the cards are horizontal, in a stack, it is convenient to return processed cards to the file case because one has only to place the processed cards on top of the stack of cards in the file case. Additionally, the cards recently processed are in the upper part of the stack, so that one can readily retrieve the most often used information cards by looking only through the information cards in the upper part of the stack and not through all the cards in the file case. When the cards are arranged vertically, side-by-side, a search has to be performed with respect to all the cards even if the desired cards are those which have recently been processed.

Thus, the system of stacking the information cards horizontally offers an advantage in that the cards are easier to handle. However, some disadvantages are associated with prior art systems of this type. One of them is the weight of the cards in the upper part of the file. When it is desired to retrieve cards in the lowermost part of the file, a magnet of great attracting force is required (if the retrieval apparatus used a magnet), because of the weight of the cards above it, and the resulting very high frictional drag. Since there are limits to the magnetic force of a magnet, there is a limit on the number of cards that can be contained in a file case if selection and withdrawal of the desired information cards is to be performed reliably, with the result that the number of information cards that can be in a file case is limited.

SUMMARY OF THE INVENTION

An object of the invention is to provide an information card selection and retrieval method and an apparatus therefor which are applicable to cassettes in which the cards are stored horizontally, and which permit desired cards to be withdrawn from the cassette readily and positively without the weight of the cards disposed in the upper part of the stack affecting adversely the selection of the cards disposed in the lower part thereof.

This object is accomplished by using a tray mounting a cassette thereon which is supported for vertical pivotal movement about a horizontal axis and is inclined forwardly when a card is to be withdrawn from the file. The edges of the cards which face downwardly in this position of the tray have coding notches and magnetic portions. Selection magnets are then moved toward the magnetic portions of the cards, while the tray is in the forwardly inclined position, and are then moved away from the cards so as to pull out a selected card obliquely downwardly of the cassette, whereby the card can be pulled out of the cassette by a relatively weak magnetic force by virtue of the fact that the weight of the cards disposed above the desired card exerts on the selected card a force tending to push the card out of the cassette rather than acting as a frictional force deterring the movement of the desired card. The desired card is selected by a plurality of selector bars disposed in a position in which they are juxtaposed against the notched edges of cards disposed in the inclined position, and a code number instructing device brings the selector bars to ON and OFF positions according to the code number of the desired card, so that the selection magnets moving toward and away from the cards pull out by a small distance only the card whose number, as encoded in notches, agrees with the arrangement of the selector bars in the ON and OFF positions, while the rest of the cards are prevented by the selector bars that are in the ON position from being pulled out of the cassette.

After the desired card is selected and retrieved, the tray is restored to its original position, and the card selected and separated from the rest of the cards is removed mechanically or manually from the apparatus for further processing.

This invention offers advantages in that it is possible to increase the number of information cards in a cassette of the type in which the cards are stacked horizontally. Selection and retrieval of the desired cards can be carried out with a high degree of efficiency. The desired cards can be withdrawn from the cassette positively irrespective of the position in which such cards are disposed in the pile of information cards.

Additional and other objects and features of the invention will become evident from the description set forth hereinafter when considered in conjunction with the accompanying drawings.

DETAILED DESCRIPTION

Figure 1:
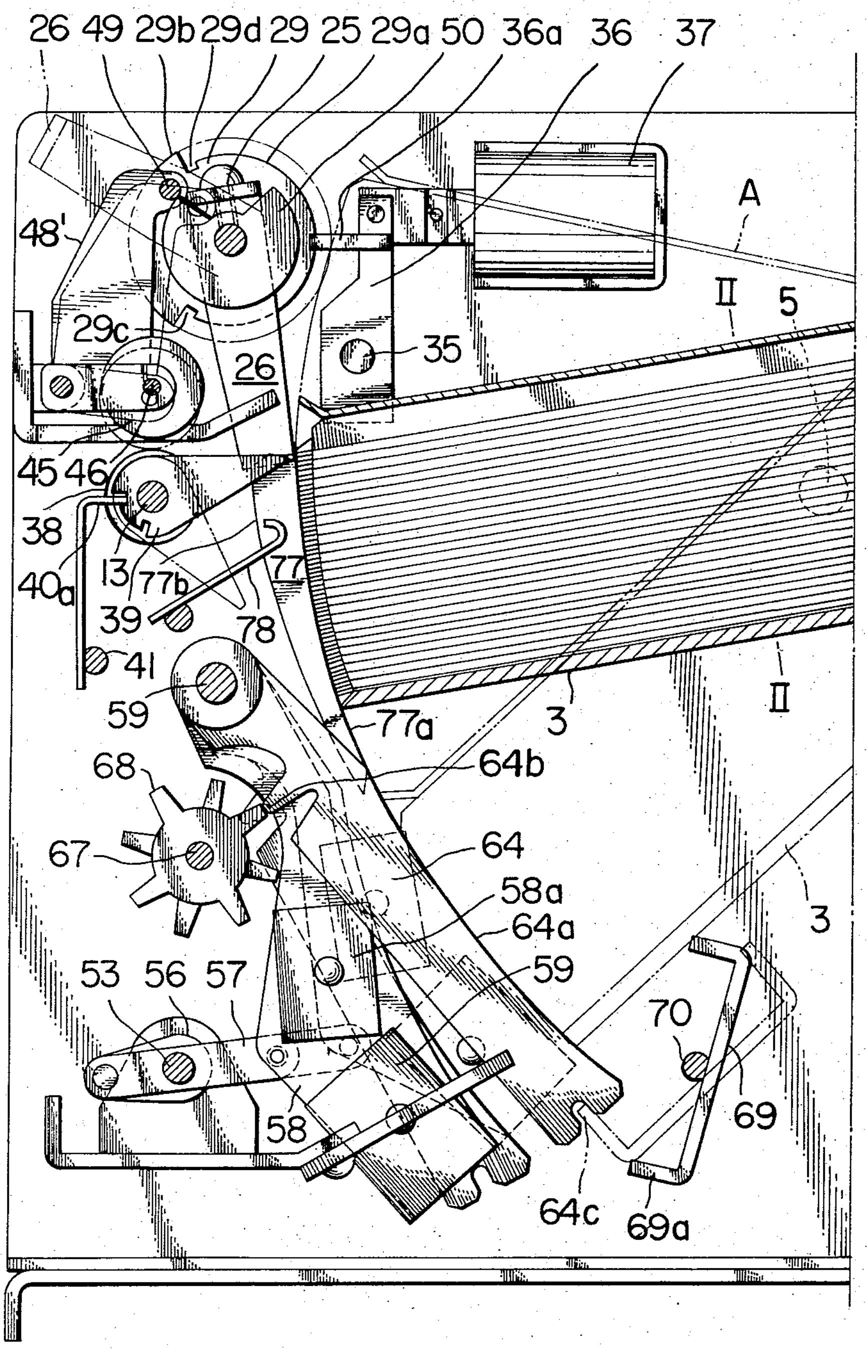
FIG. 1 is a vertical sectional view of an apparatus embodying the invention.
Figure 2:
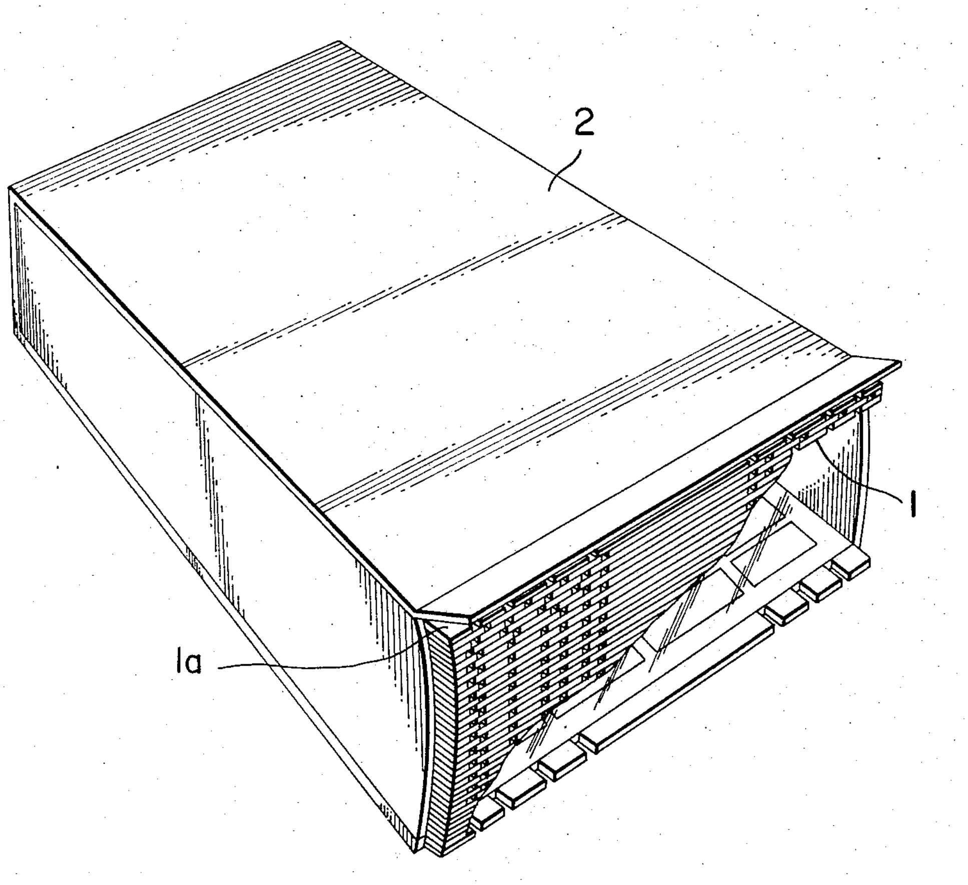
FIG. 2 is a perspective view of a cassette containing cards.

FIG. 1 shows a card selection and retrieval apparatus according to the invention. The apparatus comprises a cassette chamber A having mounted therein a cassette 2 containing a large number of information cards 1 stacked in a pile therein as shown in FIG. 2 and adapted to move in pivotal movement, and an operation chamber B having mounted therein mechanisms for selection and retrieval of desired cards 1.

Figure 3:
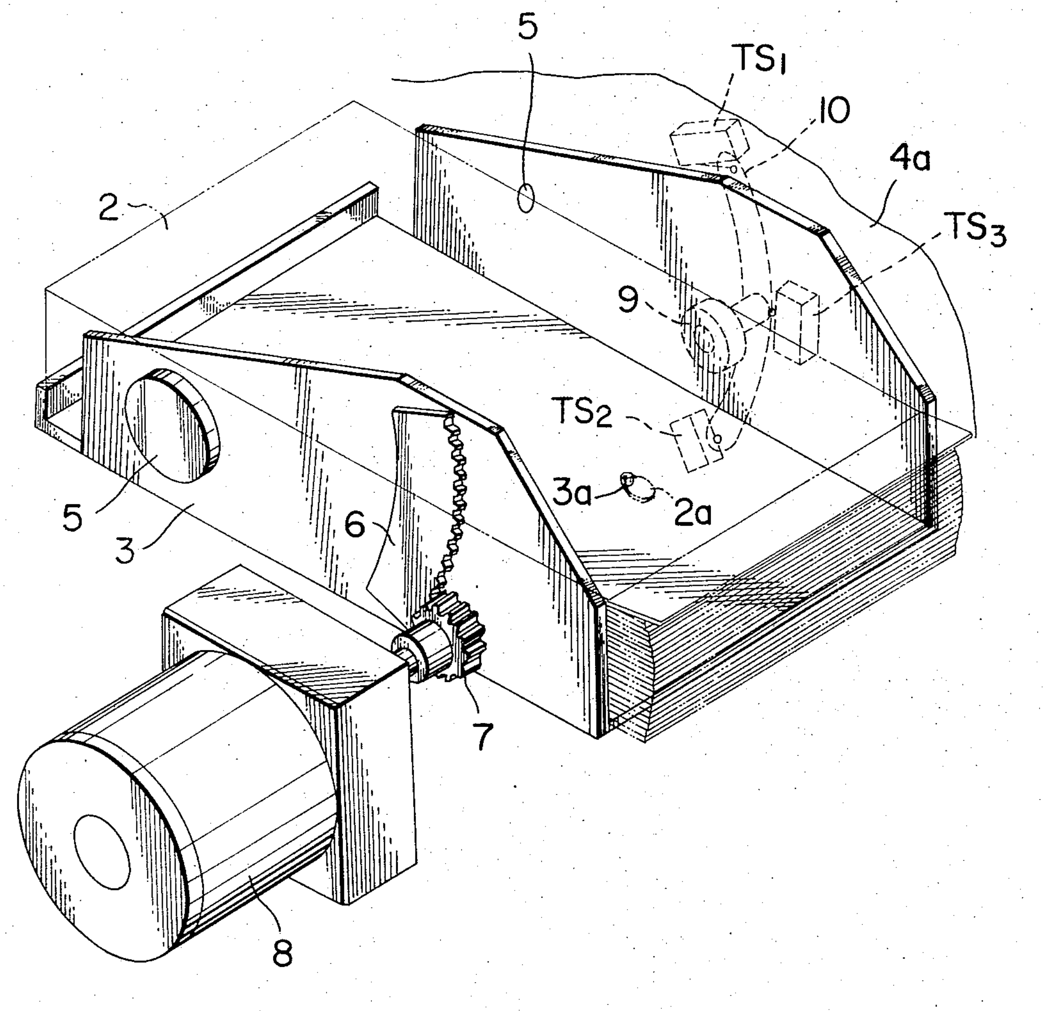
FIG. 3 is a perspective view of a tray for the cassette of FIG. 2.
Figure 4:
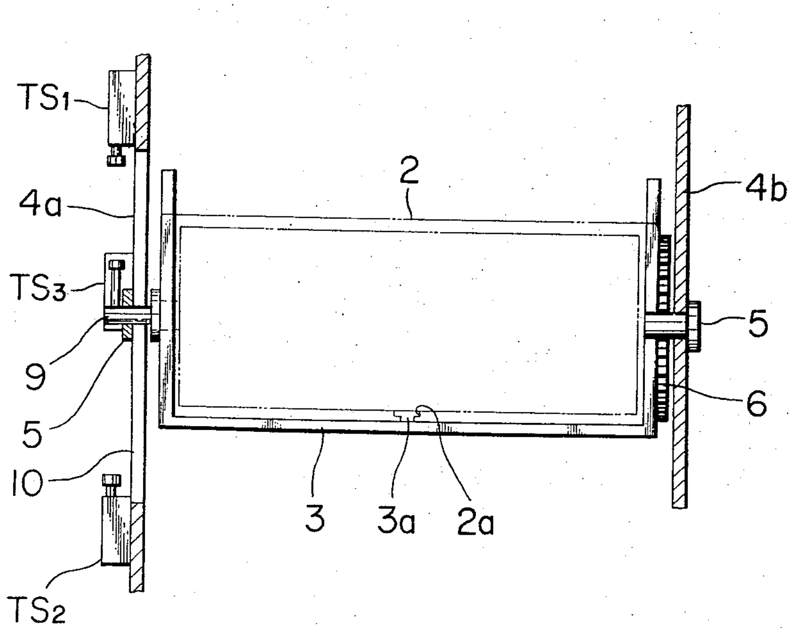
FIG. 4 is a vertical sectional view of the tray.
Figure 5:
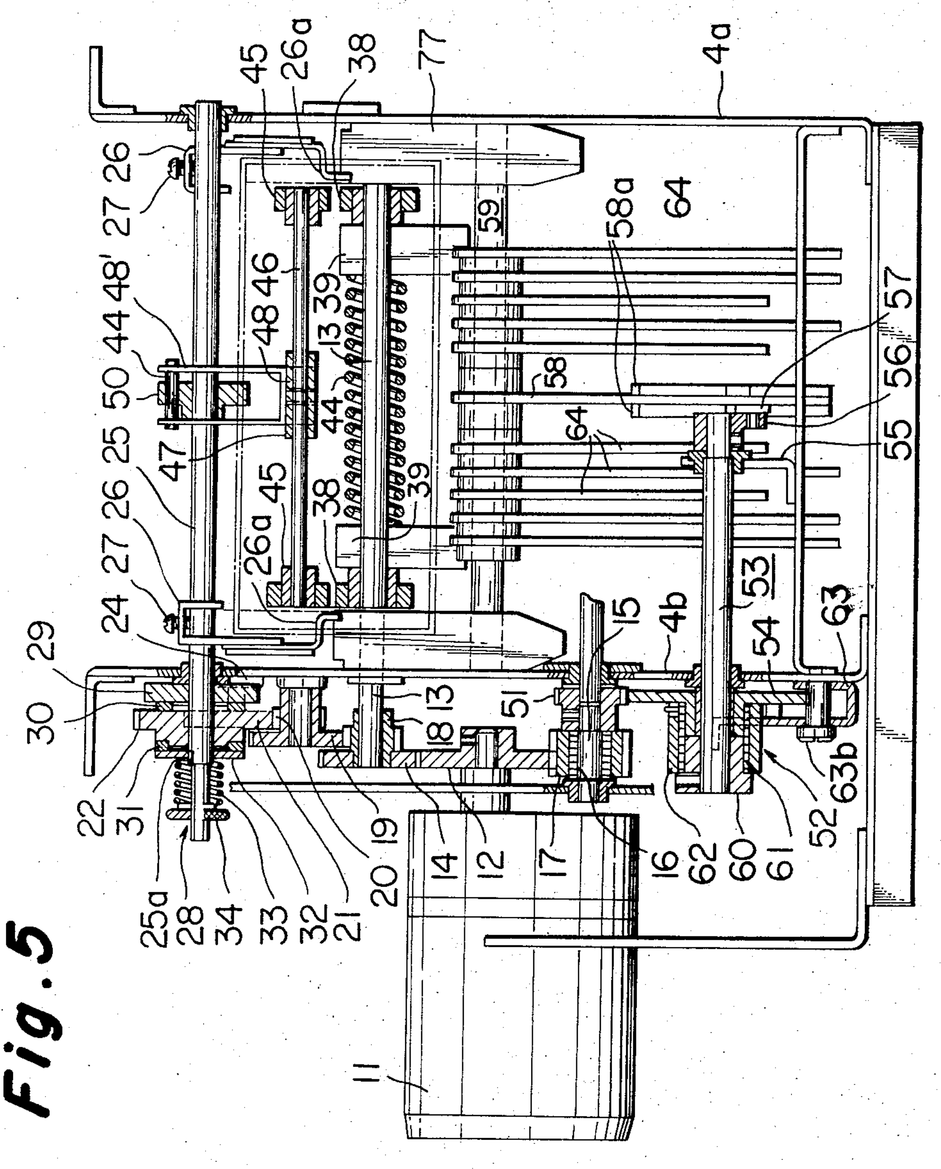
FIG. 5 is a side view of the apparatus shown in FIG. 1.

In the cassette chamber A, a tray 3 having mounted thereon the cassette 2 as shown in FIG. 3 to FIG. 5 is pivotally supported by a support shaft 5 secured to a side wall 4*a* and a partition wall 4*b* of a frame 4 as seen. In FIG. 3, a segmental gear 6 is affixed to one side wall of the tray 3 and is maintained in meshing engagement with a pinion 7 firmly mounted on an output shaft of a reversible motor 8 affixed to the apparatus frame 4. The tray 3 is moved in vertical pivotal movement about the support shaft 5 by the reversible motor 8.

An actuating pin 9 is affixed to the other side wall of the tray 3 and extends through a circularly arcuate slot 10 formed in the side wall 4*a* of the frame 4 and centered on the axis of the support shaft 5. The actuating pin 9 is adapted to actuate limit switches $TS_1$, $TS_2$ and $TS_3$ affixed to the frame 4. Each limit switch is affixed to the frame 4 in a position which is suitable for detecting one of the predetermined positions of the tray 3 to which the tray 3 moves in pivotal movement. For example, these limit switches may be three in number, as shown in FIG. 3 and may comprise an uppermost position switch TS1, a lowermost position switch TS2 and a card withdrawing position switch TS3. As shown in FIG. 4, key openings 2*a* are formed in the bottom of the cassette 2, while pins 3*a* are affixed to the tray in positions to register with openings 2*a*.

By inserting the pins 3*a* in the key openings 2*a*, it is possible to correctly position the cassette 2 on the tray 3 and to prevent dislodging the cassette 2 from the tray 3 when the tray moves into an inclined position.

Figure 6:
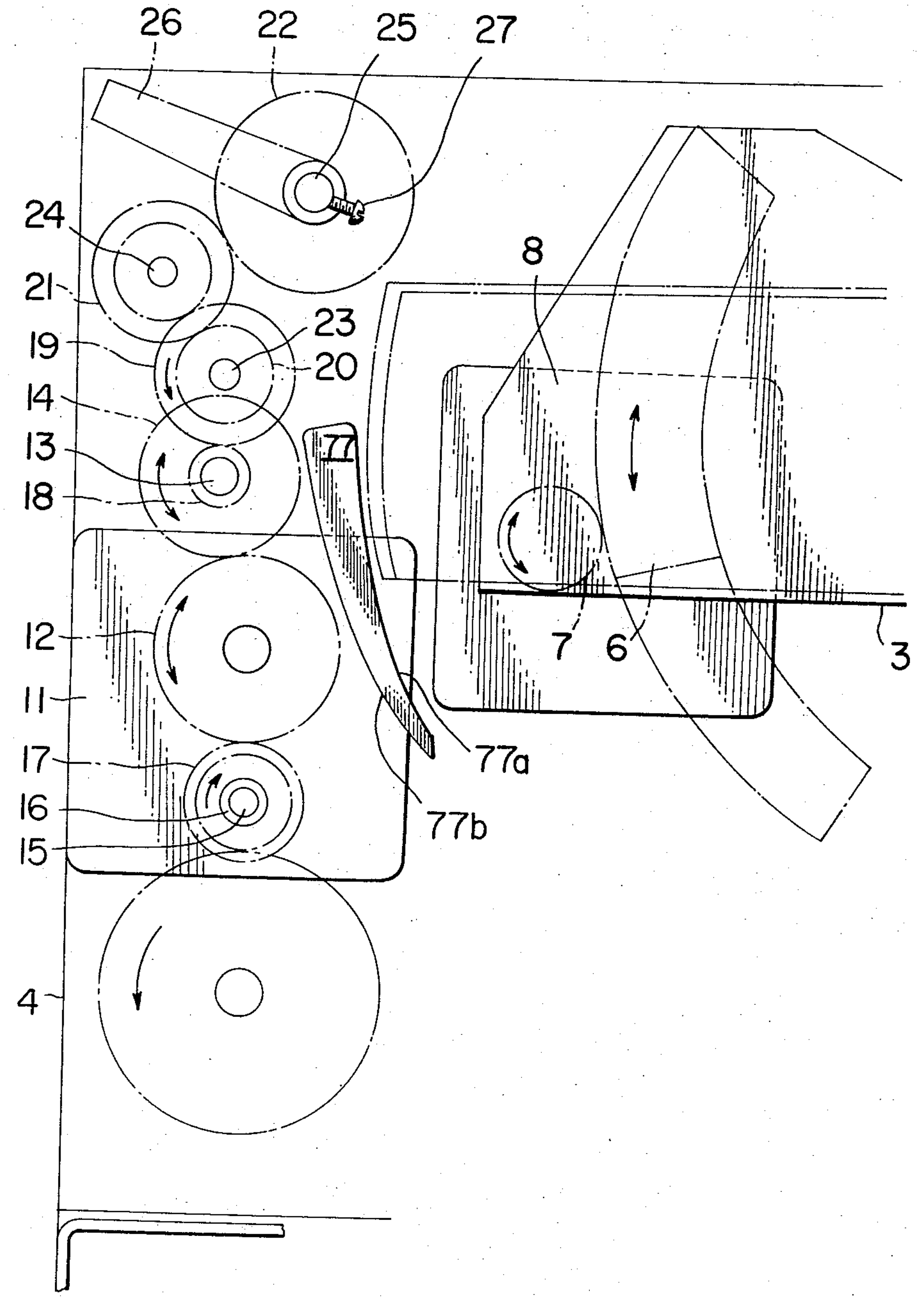
FIG. 6 shows a transmission means incorporated in the apparatus of FIG. 1.

As seen in FIGS. 5 and 6, the operation chamber B houses a reversible selection motor 11 for operating the retrieval mechanisms. The motor 11 is affixed to a side wall 4*c* of the frame 4. Threadably connected to an output shaft of the motor 11 is a pinion 12 which is maintained in meshing engagement with a gear 14 affixed to feed roller shaft 13 that is rotatably supported by the frame 4 through suitable bearings and with a gear 17 supported through a one-way clutch 16 by a shaft 15 rotatably supported by the frame 4.

The gear 14 driven by the pinion 12 and its rotation is transmitted through a gear 18 affixed to the feed roller shaft 13, a gear 19 meshing with gear 18, a gear 20 rotating with gear 19 as a unit, and an idling gear 21 meshing with gear 20, to a gear 22 meshing with idle gear 21. Gears 19 and 20 are rotatably supported by a shaft 23 affixed to the frame 4, idling gear 21 is rotatably supported by a shaft 24 attached to the frame 4 and gear 22 is rotatably supported by a card feed shaft 25.

Figure 7:
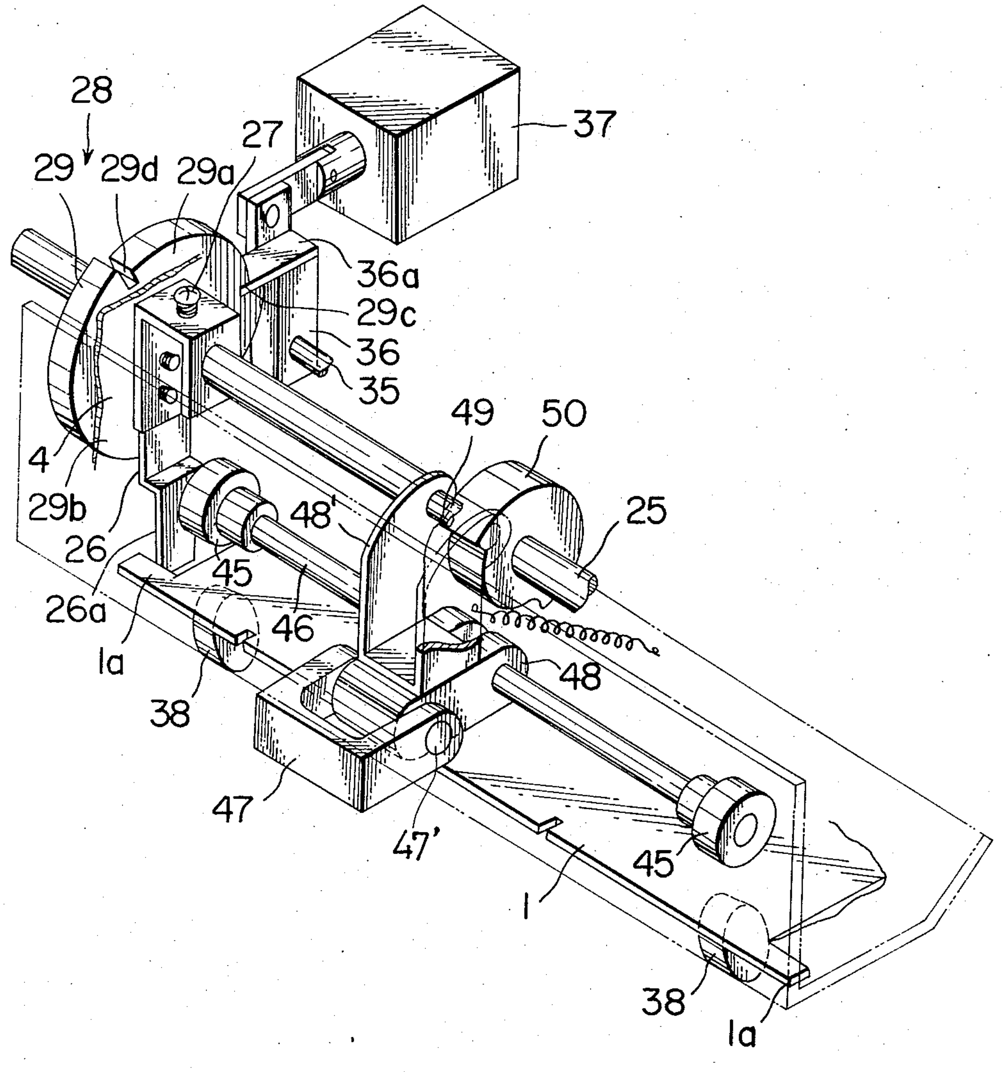
FIG. 7 is a perspective view of a cam shaft and hold-down rollers incorporated in the FIG. 1 apparatus.

As shown in FIG. 7, the card feed shaft 25 is rotatably supported by the frame 4 and has affixed thereto by cap screws 27 a plurality of feed members 26 each of which is disposed in a position corresponding to one of the two lugs 1*a* formed at opposite ends of each information card 1. By loosening the cap screws 27, it is possible to adjust the axial positions of the feed members 26 as desired. Clutch means 28 is mounted on the feed shaft 25.

As shown in FIG. 5, the clutch means 28 comprises a clutch cam 29 affixed to the feed shaft 25, the gear 22 pressing against the clutch cam 29 through a friction ring 30, a keep plate 32 pressing against the gear 22 through a friction ring 31, a pressing spring 33 seated against the keep plate 32, and an adjusting plate 34 threaded into the card feed shaft 25 and serving as a seat for the pressing spring 33. Each of the rings 30 and 31 may be a coil ring. By adjusting the amount of threadable engagement of the plate 34 with the card feed shaft 25, it is possible to adjust the pressing force exerted by the pressing spring 33. The keep plate 32 is keyed onto a cutout flat portion 25*a* of the shaft 25 so it is free to move axially of the shaft 25 but is kept from rotating relative to the shaft 25.

As shown in FIG. 7, the clutch cam 29 comprises a minor diameter circularly arcuate portion 29*a* whose arc corresponds to the pivoting angle of the feed members 26, and a major diameter circularly arcuate portion 29*b* forming the rest of the circumference. Notches 29*c*, 29*d* are formed in the boundaries between the minor diameter circularly arcuate portion 29*a* and the major diameter circularly arcuate portion 29*b*. A cam stopper 36 pivotally supported by a pin 35 connected to the frame 4 includes a horizontal member 36*a* receivable in the notches 29*c* and 29*d*. The cam stopper 36 also includes a free end portion which pivotally supports the plunger of a solenoid 37. The horizontal member 36*a* is normally inserted in the notch 29*c* of the clutch cam 29 to maintain the clutch cam 29 stationary.

The rotation of the pinion 12 rotates the gear 22 of the clutch means 28. However, since the clutch cam 29 is kept stationary by the cam stopper 36, the shaft 25 remains immovable, because rotation of the gear 22 is not transmitted, although slip occurs between the gear 22 and the coil ring 30 and between the coil ring 30 and the clutch cam 29. At this time, the solenoid 37 is energized by a signal from a card detector described subsequently, and the card stopper 36 is pulled toward the solenoid 37. This releases the horizontal member 36*a* of the cam stopper 36 from engagement in the notch 29*c*, so that the cam clutch 29 is free to operate. After being energized for a short time interval, the solenoid 37 is de-energized and the horizontal member 36*a* of the cam stopper 36 is restored to its original position, so that the member 36*a* is brought into pressing engagement with the edge of the minor diameter circularly arcuate portion 29*a*.

As soon as the horizontal member 36*a* is released from engagement in the notch 29*c*, the clutch cam 29 rotates together with the rotating gear 22 because of the frictional dragging applied to the clutch cam 29 by the friction ring 30 which is pressed by the spring 33. After the clutch cam 29 or the shaft 25 has rotated through a predetermined angle, the horizontal member 36*a* of the cam stopper 36 moving in sliding motion along the edge of the minor diameter circularly arcuate portion 29*a* is brought into engagement in the other notch 29*d*, thereby interrupting the rotation of the clutch cam 29. The shaft 25 stops rotating at this time.

After a predetermined operation is performed, the motor 11 is rotated in the opposite direction and the solenoid 37 is energized. Upon energization of the solenoid 37, the clutch cam 29 is rotated in the opposite direction and the shaft 25 rotates until the horizontal member 36*a* of the cam stopper 36 is brought into engagement in the notch 29 again. Thus, the card feed members 26 move in pivotal movement through a predetermined angle to pull out the cards as described below and then the card feed members 26 move back in pivotal movement through the same angle to return the cards to a stand-by position as the shaft 25 rotates through a predetermined angle in the normal direction and then rotates through the same angle in the reverse direction.

Figure 8:
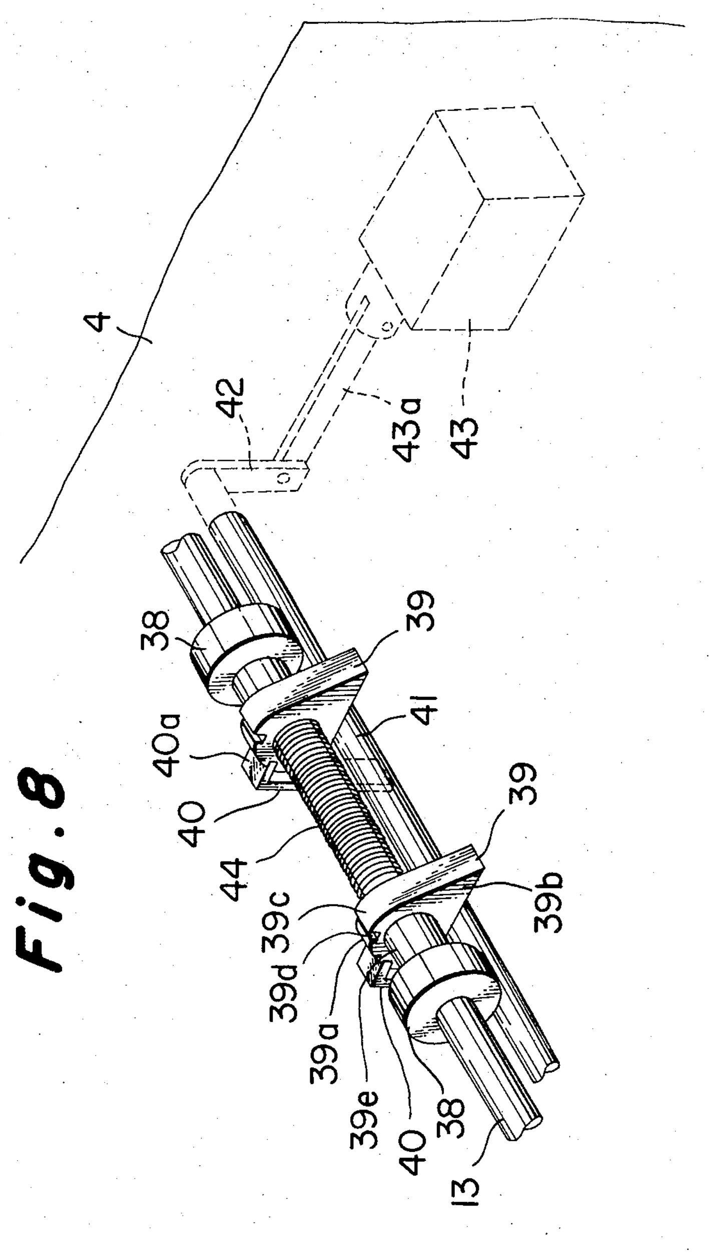
FIG. 8 is a perspective view of guide members.

In FIG. 5 and FIG. 8, friction feed rollers 38 made of a material such as rubber are mounted on the feed roller shaft 13 and are spaced apart from each other by a distance substantially corresponding to the width of the information cards 1 so as to be disposed near opposite ends of the cards. Guide members 39 are pivotally mounted on the shaft 13 and each is disposed inwardly of one of the feed rollers 38. Interposed between the two guide members 39 is a spring 44 which urges the guide members 39 into pressing engagement with the feed rollers 38.

Each guide member 39 is shaped to comprise a minor diameter circularly arcuate portion 39*a* and a major diameter portion 39*c* including a triangular protruding portion 39*b*. The minor diameter circularly arcuate portion 39*a* is formed therein with notches 39*d* and 39*e* disposed in the boundaries between the minor diameter circularly arcuate position 39*a* and the major diameter portion 39*c*.

Each of stop levers 40 is adapted to be brought into or out of engagement in the notch 39*d* (and 39*e*) formed in the guide members 39 and is affixed to a shaft 41 rotatably supported by the frame 4. Connected to one end of the shaft 41 is a lever 42 which has pivotally connected thereto a lever 43*a* which in turn is connected to a plunger of a solenoid 43 affixed to the frame 4. EAch stop lever 40 is formed at its free end with a claw 40*a* adapted to be received in the notch 39*d* or 39*e* formed in each guide member 39.

Upon energization of the solenoid 43, the claws 40*a* are released from engagement in the notches 39*d* or 39*e* and the guide members 39 are angularly rotated by the feed roller shaft 13 through the feed rollers 38 with which the guide members 39 are maintained in frictional engagement, until the claws 40*a* are brought into engagement in the notches 39*e* or 39*d*.

The feed roller shaft 13 rotates as long as the motor 11 remains operative. Accordingly, the feed rollers 38 rotate with the feed roller shaft 13 during that time.

Each information card 1 is withdrawn and returned by the rotating feed rollers 38. In order that the card may be fed positively by the feed rollers 38, a pair of hold-down rollers 45 (FIG. 7) for holding the card down against the feed rollers 38 are mounted above the feed rollers 38. The hold-down rollers 45 may be made of rubber and are affixed, as shown in FIG. 7, to a shaft 46 which is rotatably supported by a support 48 supported in turn by a bracket 47 through a shaft 47 for vertical pivotal movement about the shaft 47'. Affixed to the support 48 is a bracket 48' carrying a cam follower 49 which is maintained in engagement with the peripheral surface of a cam 50 affixed to the card feed shaft 25.

The cam 50 is adapted to move the cam follower 49 upwardly so that the supporter 48 may be pivoted upwardly to move the hold-down rollers 45 away from the feed rollers 38 during the time the shaft 25 is rotating through an angle at which the feed members 26 pull out and return a card. The cam 50 is also adapted to move the cam follower 49 downwardly so that the support 48 may be pivoted downwardly to move the hold-down rollers 45 into pressing engagement with the feed rollers 38 during the time the shaft 25 is rotating through an angle at which no pull-out or restoration of cards take place. The cam 50 is shaped as shown in FIG. 7 and includes a major diameter portion and a minor diameter portion.

The rotation in one direction only of the pinion 12 shown in FIG. 5 is transmitted, through gear 17 and one-way clutch 16, to the shaft 15 on which is threadably mounted a gear 51 maintained in meshing engagement with a gear 54 connected through spring clutch means 52 to a shaft 53 rotatably supported by the frame 4 and a bracket 55.

Figure 9:
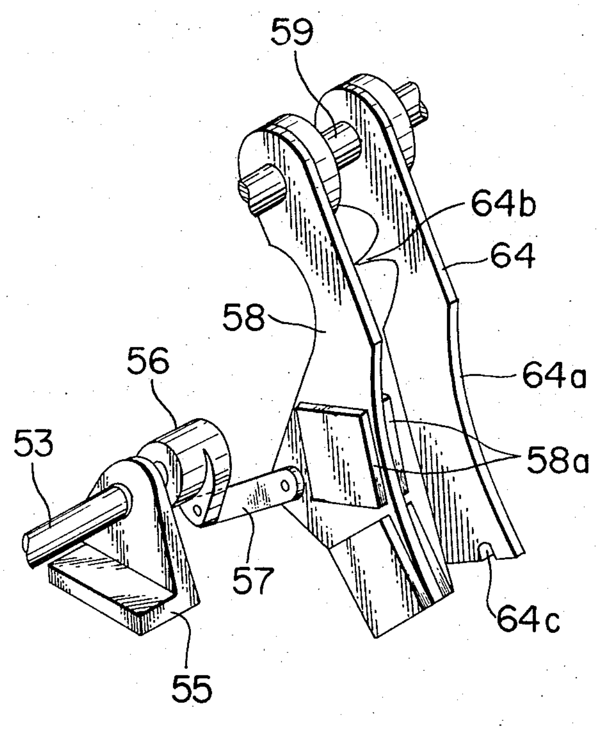
FIG. 9 is a perspective view of a pull-out lever.

As shown in FIG. 9, a crank lever 56 is connected to one end of shaft 53 by a suitable cap screw. Pivotally connected to the crank lever 56 is one end of a connecting rod 57 which is pivotally connected at its other end to a card withdrawing lever 58 pivotally supported by a support shaft 59 affixed to the frame 4. Card attracting magnets 58*a* are secured to the card withdrawing lever 58. When shaft 53 makes one complete revolution by virtue of the action of the spring clutch means 52, the crank 56 causes the card withdrawing lever 58 to make one reciprocating pivotal movement about shaft 59.

Figure 10:
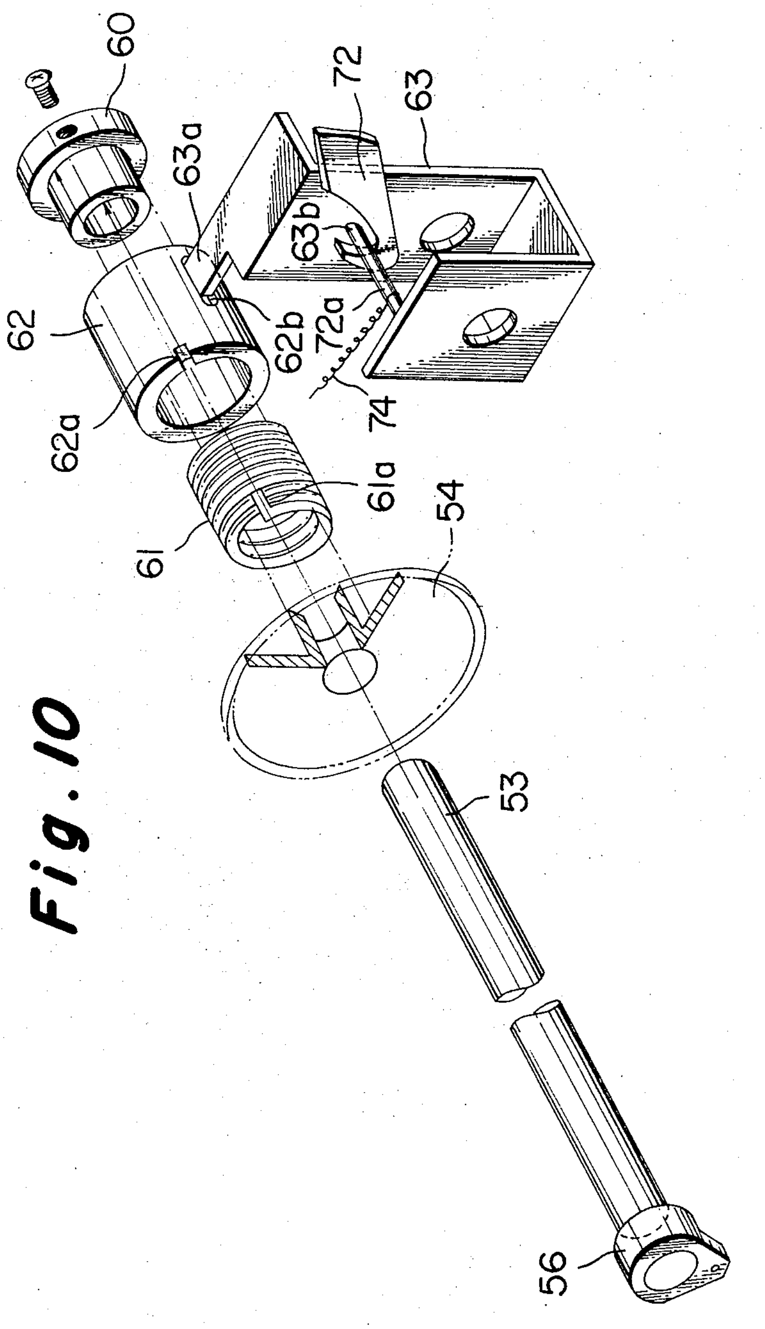
FIG. 10 is an exploded perspective view of a spring clutch.

In FIG. 5 and FIG. 10, the spring clutch means 52 is shown as comprising a holding ring 60 secured to shaft 53 by a suitable cap screw, the gear 54 rotatably supported by shaft 53, a coil spring 61 and a clutch sleeve 62. The spring 61 is fitted over the outer peripheries of the facing bosses of the holding ring 60 and gear 54. The outer diameter of the boss of the holding ring 60 and the outer diameter of the boss of gear 54 are such that the two members are snugly fitted in the spring 61. The spring 61 which is turned at one end portion as shown at 61*a* has fitted thereon the clutch sleeve 62 which is formed at an end surface with a cut-out 62*a* for inserting the turned end portion 61*a* therein. The clutch sleeve 62 is also formed on its outer peripheral surface with an axial groove 62*b* for receiving therein an engaging portion 63*a* of a stopper 63. The coil spring 61 is constructed such that it is tightened as it is wound in slaved relation to the rotation of shaft 54.

Releasing of the engaging portion 63*a* of the stopper 63 from engagement in the groove 62*a* in the clutch sleeve 62 permits the spring 61 to be wound by the friction between the outer peripheral surface of the boss of gear 54 and the inner surface of the spring 61, so that the spring 61 is forced to wind tightly over the outer peripheral surface of the boss of the holding ring 60. Thus, rotation of gear 54 is transmitted to the holding ring 60 through the spring 61 to thereby rotate shaft 53 to which the holding ring 60 is secured. Rotation of the spring 61 with gear 54 results in the clutch sleeve 62 being rotated by the turned end portion 61*a* of the spring 61.

The stopper 63 is restored to its original position as soon as its engaging portion 63*a* is released from engagement in the groove 62*b*. Thus, after the clutch sleeve 62 makes one complete revolution, the engaging portion 63*a* of the stopper 63 is brought into engagement in the groove 62*b* again, so that rotation of the clutch sleeve 62 is interrupted. This removes the force which is exerted by the spring 61 on the holding ring 60 and gear 54, thereby permitting gear 54 to rotate alone without moving the spring 61 and holding ring 60 therewith. The spring clutch means 52 is actuated by the action of the stopper 63 as aforementioned to connect and disconnect the gear and shaft. The stopper 63 is supported by a pin 63*b* affixed to the side wall 4*b*.

Figure 11:
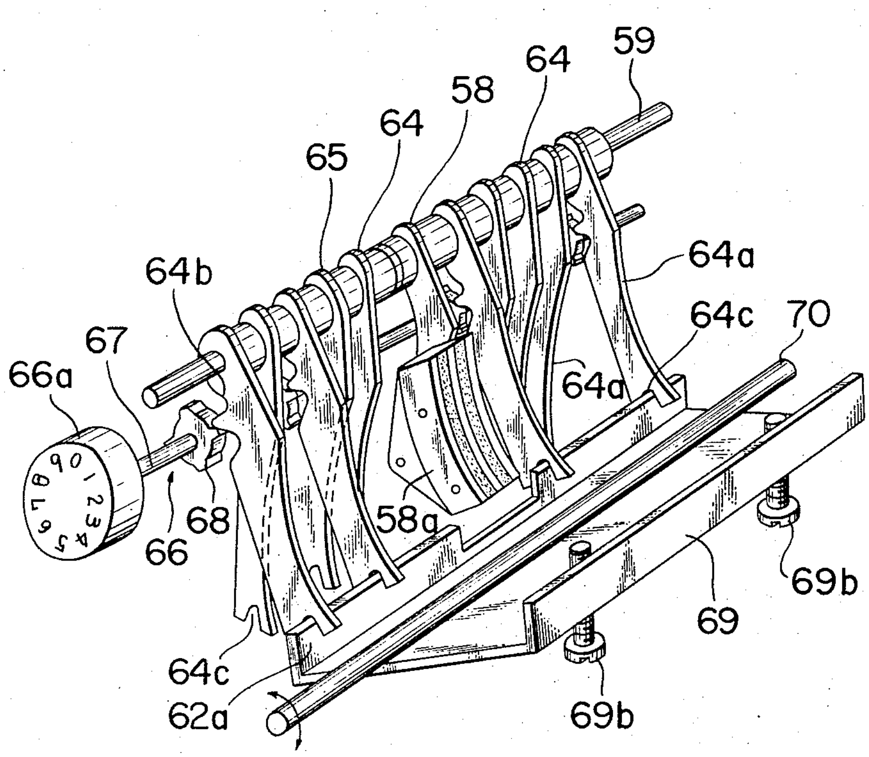
FIG. 11 is a perspective view of selector bars.

As shown in FIG. 11, selector bars 64 corresponding in number and position to the notches formed in the coded edge of each information card 1 are pivotally supported by the shaft 59 which also supports the card withdrawing lever 58. The selector bars 64 are spaced apart equidistantly from one another by collars 65 so that each faces the position of a different one of the notches in each information card 1. Each selector bar 64 has a surface 64*a* facing the coded edge of each card and formed in a circularly arcuate shape which corresponds to the path of movement of the coded edge of each card contained in the cassette 2.

Each selector bar 64 is formed with a rearwardly extending projection 64*b* adapted to cooperate with selector bar setting means 66 (FIGS. 1 and 11) adapted to set each selector bar at an ON or OFF position according to the code number of the desired card. Each selector bar 64 is also formed at its lower end with a cutout 64*c* adapted to hold the selector bar 64 positively in its selected position. As shown, the selector bar setting means 66 comprises cams 68 and a dial 66*a* affixed to a shaft 67 rotatably supported by the frame 4. The selector bar of bars 64 selected according to the code number of the particular card are moved upwardly into the ON position by the cams 68 having elevated and depressed areas adapted to cooperate with the projections 64*b*. See U.S. Pat. application Ser. No. 372,120 for the details of the selector bar setting means 66.

Figure 12:
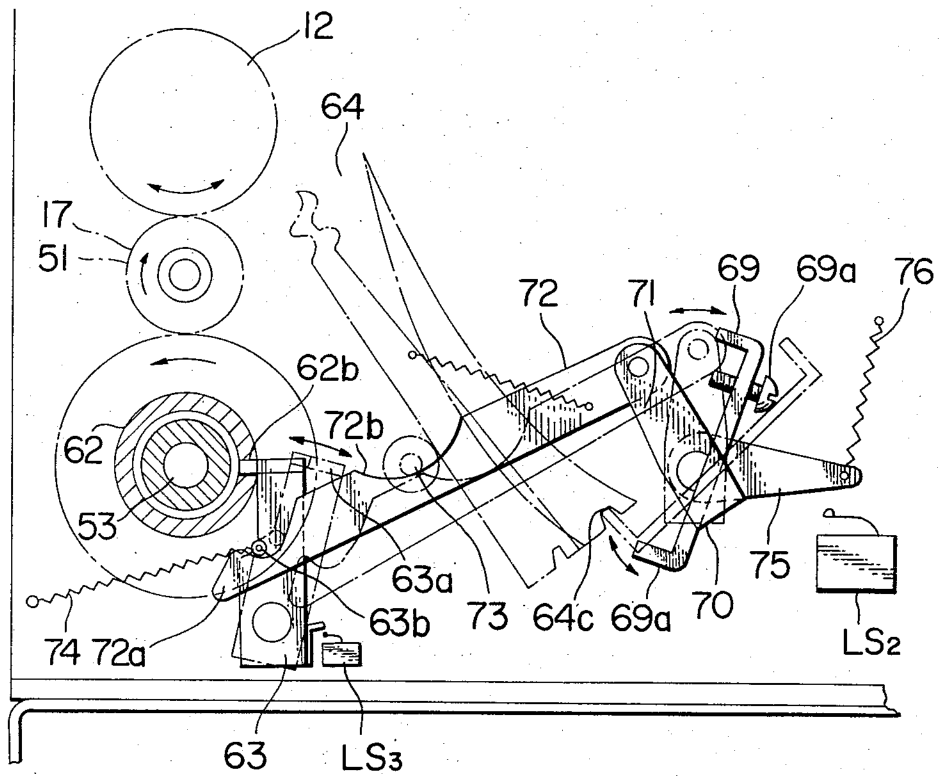
FIG. 12 shows spring clutch operating means all forming a part of the apparatus shown in FIG. 1.

Movement of the tray 3 to its lowermost position in pivotal movement causes an actuation lever 69 affixed to a support pin 70 rotatably supported by the frame 4 to move in pivotal movement about the support pin 70 as the tray 3 strikes against the actuation lever 69 (see FIGS. 1, 11 and 12). Affixed to the support pin 70 is a crank lever 71 having pivotally connected thereto one end of a stopper actuation lever 72 which is formed at its other end with a hook 72*a* adapted to engage the pin 63*b* affixed to the stopper 63 (see FIG. 10). The hook 72*a* is normally engaged by the pin 63*b*.

When the actuation lever 69 is moved in pivotal movement by the tray 3, the stopper actuation lever 72 is pulled by the pivoting crank lever 71, so that the hook 72*a* pulls the pin 63*b* and moves the stopper 63 in pivotal movement to thereby release the engaging portion 63*a* of the stopper 63 from engagement in the groove 62*b* formed in the clutch sleeve 62. At this time, the lever 72 is pulled downwardly by the action of a cam portion 72*b* formed in the lever 72 and a pin 73 affixed to the frame 4, so that the hook 72*a* is released from engagement with the pin 63*b* of the stopper 63. The stopper 63 is restored to its original position by the biasing force of a spring 74.

If the tray 3 moves upwardly in pivotal movement, then the actuation lever 69 is moved in pivotal movement back to its original position by the action of a lever 75 affixed to the support pin 70 and a tension spring 76 pulling the lever 75, so that the stopper actuation lever 72 is restored to the position in which the hook 72*a* engages the pin 63*b*. The actuation lever 69 is formed at one end with a lock member 69*a* which is engaged in the cutout or cutouts 64*a* of the selector bar or bars 64 in the ON position when the actuation lever 69 is moved in pivotal movement by the tray 3, so as to thereby hold the selector bar or bars in the ON position against the force with which the cards are withdrawn from the cassette 2.

The actuation lever 69 has threadably connected thereto in adjusting screw 69*b* as shown in FIG. 11 for adjusting the standby position from which the lever 69 begins to move in pivotal movement upon the tray 3 striking thereagainst. In FIGS. 1, 5 and 6, a separator 77 is disposed in a position inside the casing 4 through which the lug 1*a* at one side of each card 1 passes as the tray 3 moves in pivotal movement. Each separator 77 is formed with a guide surface 77*a* for guiding the lugs of the cards which are not withdrawn, and a withdrawing surface 77*b* for withdrawing the selected card as the tray 3 moves in pivotal movement. Each guide surface 77*a* is formed as a circularly arcuate surface corresponding to the path of movement of the lugs 1*a* of the cards at the pivotal movement of the tray 3, while each withdrawing surface 77*b* is formed such that the distance between the surfaces 77*a* and 77*b* becomes greater, i.e., the thickness of each separator 77 increases, in going from the lower end toward the upper end so as to pull the card gradually from the lower end of the separators 77.

Figure 15:
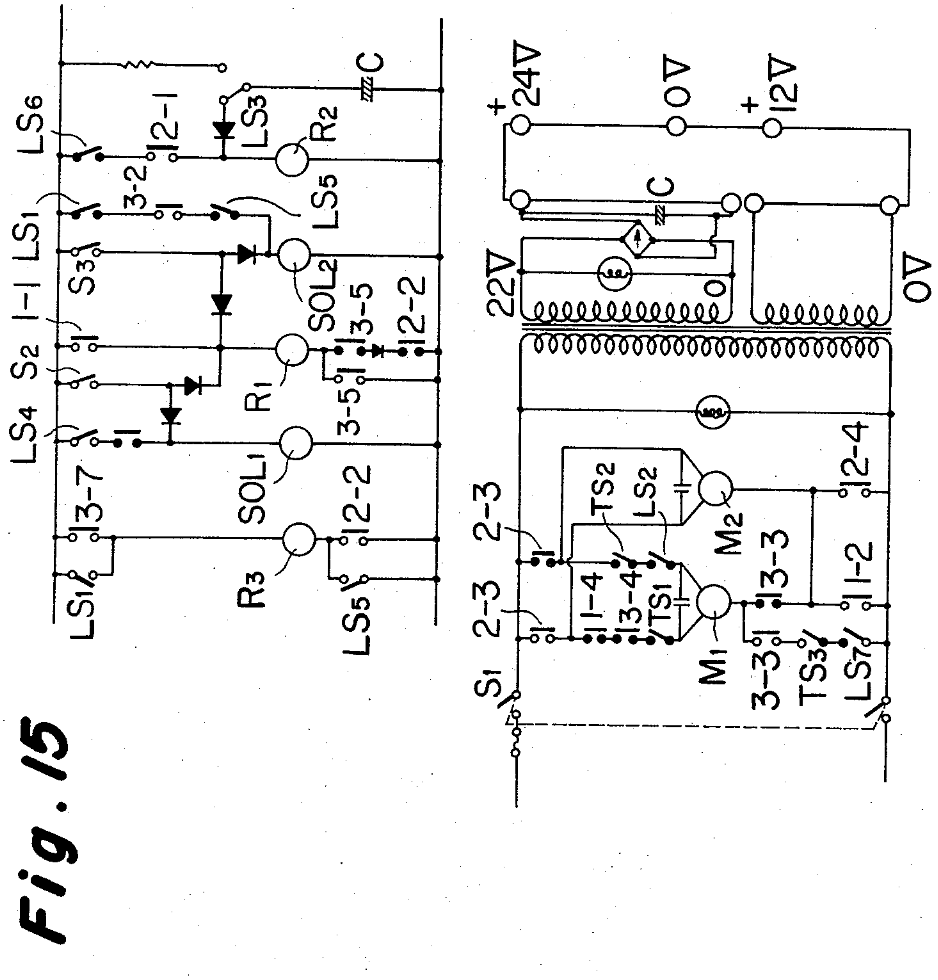
FIG. 15 is a diagram showing an electrical control circuit for the FIG. 1 apparatus.

The circuit shown in FIG. 15 comprises relays R, solenoids SOL, pushbutton switches S, limit switches LS, a tray operating motor M1, and the selection motor M2, and is described in conjunction with the apparatus described above.

The operation of the invented apparatus is described below in steps (*a*)–(*f*). The reference symbols of the parts shown in FIG. 15 are in parenthesis.

a. The cassette 2 is placed on the tray 3.

b. The selection dial 65 is turned to set the selector bars at the desired code, whereby chosen selector bars 64 are pushed out to the ON position by the cam or cams 86.

c. The start button (S2) is pushed after the power source switch (S1) is depressed to connect the apparatus to an AC power source.

The cassette motor 8 (M1) and selection motor 11 (M2) are rotated in the normal direction, and the solenoid 43 (SOL1) is energized.

Figure 13A:
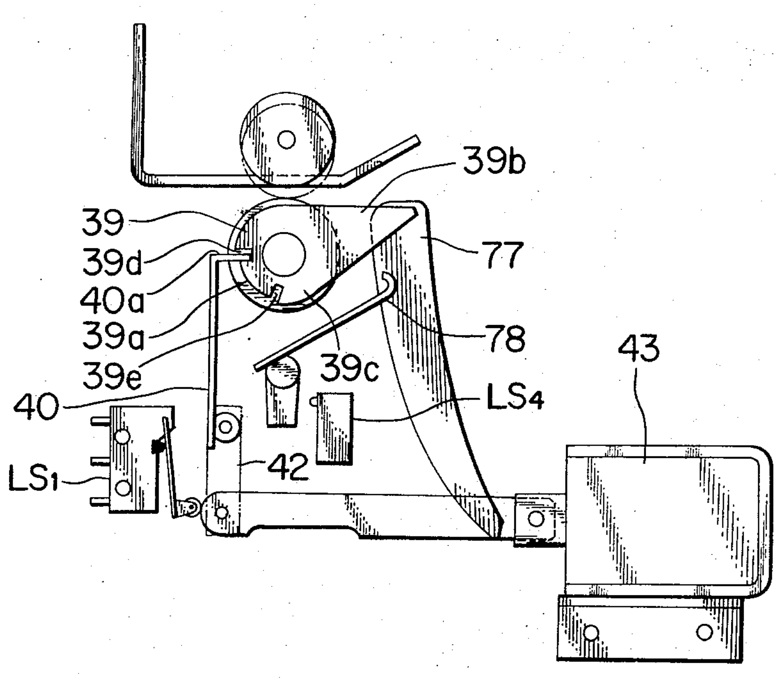
FIG. 13*a* to FIG. 13*e* are views in explanation of the operation of the guide members of FIG. 8.
Figure 13B:
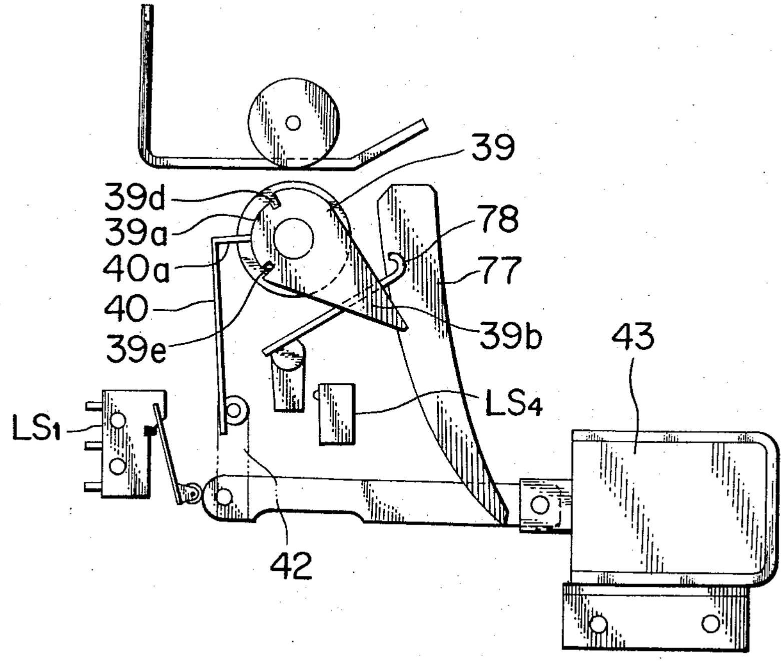
Figure 13C:
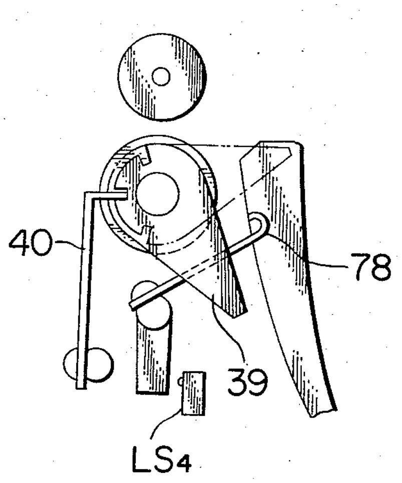
Figure 14A:
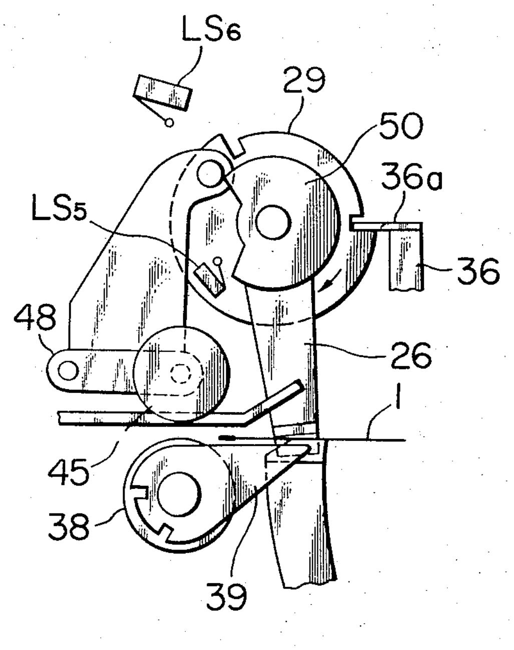
FIG. 14*a* to FIG. 14*e* are views in explanation of the operation of feed members and card feed rollers forming a part of the FIG. 1 apparatus.

Rotation of the selection motor 11 (M2) results in rotation of gear 14, and energization of the solenoid 43 (SOL1) causes the stop levers 40 to move in pivotal movement, so that the claws 40*a* are momentarily released from engagement in the notches 39*d* formed in the guide members 39, thereby permitting the guide members 39 to angularly rotate from the position shown in FIG. 14*a* to the position shown in FIG. 13*b*. During the time the claws 40*a* are sliding along the minor diameter circularly arcuate portions 39*a*, the limit switch LS1 is in an ON position. When the claws 40*a* engage the notches 39*b*, the guide members 39 stop in the downwardly inclined position shown in FIG. 13*c*. During the time the guide members 39 move from the position shown in FIG. 13*a* to the position shown in FIG. 13*c*, the tray 3 begins its pivotal movement to a forwardly inclined position by the action of the cassette motor 8(M).

At the terminal stages of the pivotal movement of the tray 3, the tray 3 strikes the actuation lever 69 and moves the same in pivotal movement. When the tray 3 reaches its maximum inclined position, the lever 75 actuates the switch LS2 to interrupt rotation of the cassette motor 8(M1). The cassette motor 8(M1) thus remains inoperative even if the pin 9 affixed to the tray 3 actuates the switch TS2 at the lowermost position.

Upon the tray 3 stopping at its maximum inclined position, the lock member 69a of the actuation lever 69 is brought into engagement with the lock groove or grooves 64a of the selector lever or levers 64 in the ON position. At the same time, the stopper actuation lever 72 operates as the actuation lever 69 pivots, so that the hook 72a formed in the former pulls the pin 63b movably supporting the stopper 63 and moves the stopper 63 in pivotal movement. This results in the engaging portion 63a of the stopper 63 being released from engagement in the groove 62b formed in the clutch sleeve 62. The stopper 53 actuates the switch LS3 during the time the engaging portion 63a of the former is out of engagement in the groove 62b.

Releasing of the engaging portion 63a of the stopper 63 from engagement in the groove 62b engages the spring clutch means 52, so that shaft 53 makes one complete revolution.

Immediately after the actuation lever 72 engages the spring clutch means 52, the cam portion 72b of the actuation lever 72 causes the hook 72a to be released from engagement with the pin 63b movable supporting the stopper 63, thereby permitting the stopper 63 to be restored to the position in which it is in engagement with the outer periphery of the clutch sleeve 62 by the biasing action of the spring 74.

One complete revolution of shaft 53 by the action of the spring clutch 52 causes the withdrawing lever 58 to be moved in one reciprocating pivotal movement by the action of the crank 56. The withdrawing lever 58 is moved toward end surfaces of the cards contained in the cassette and attracts the cards by the action of the magnets 58a before returning to its original position. The card whose notch or notches agree in position with the selector bar or bars in the ON position is pulled partly out of the cassette, while similar movement of the rest of the cars is presented by the selector bar or bars in the ON position, and they remain in their original positions in the cassette 2.

As the withdrawing lever 58 moves in its reciprocating pivotal movement, the engaging position 63a of the stopper 63 is brought into engagement in the groove 62b. This causes the switch LS3 to be reversed, so that the cassette motor 8(M1) begins to rotate in the reverse direction and at the same time the selection motor 11 (M2) starts rotating in the reverse direction.

Rotation of the cassette motor 8 in the reverse direction moves the tray 3 upwardly. The card pulled out by the magnets 58a moves along the withdrawing surfaces 77b of the separators 77, and the rejected cards move along the guide surfaces 77b thereof. Thus, the selected card is pulled out still more from the cassette. The lever 75 releases the switch LS2 during the upward movement of the tray 3.

Figure 13D:
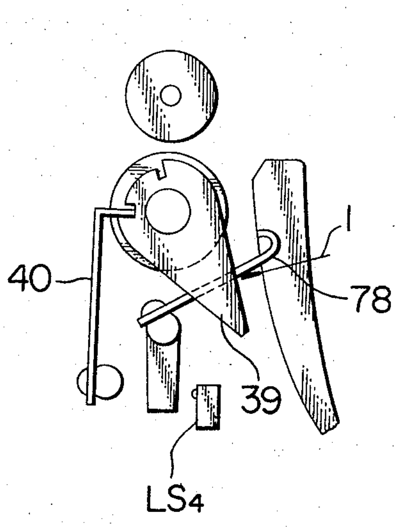
Figure 13E:
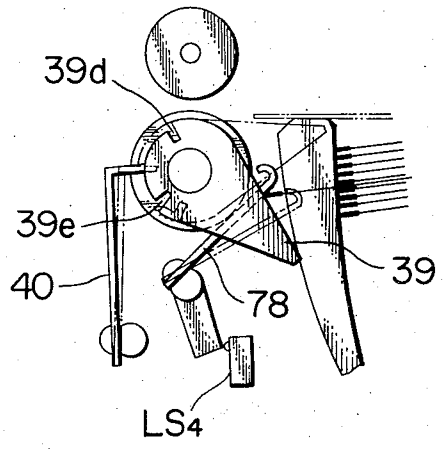

As seen in FIG. 13d, a predetermined time before the cassette 2 reaches a card withdrawing position, the selected card moves close to card detection levers 78. When the selected and partly withdrawn card reaches the predetermined position shown in FIG. 13e, the switch LS4 is actuated by the levers 78 pivoted by the upwardly moving selected card to energize the solenoid 43 (SOL1) so as to release the claws 40a of the stop levers 40 from engagement in the notches 39e in the guide members 39. This permits the guide members 39 to move upwardly, together with the upward movement of the selected card, until the upper surface of each guide member 39 becomes horizontal (as shown in dash-and-dot lines in FIG. 13e). At this time, the claws 40a are brought into engagement in the notches 39d and the movement of the guide members 39 is interrupted. The switch LS1 remains operative from the time the claws 40a are released from engagement in the notches 39e until the time they are brought into engagement in the notches 39d.

The switch LS1 is rendered inoperative and the motor 8 (M1) stops rotating when the claws 40 are brought into engagement in the notches 39d. The guide members 39 keep the switch LS1 operative during the time the claws 40a are in engagement with the minor diameter circularly arcuate portions 39A. Thus the guide members 39 function as a timer.

When the guide members 39 stop moving, the solenoid 37 (SOL2) is energized as the result of de-actuation of the switch LS1. This pulls the horizontal member 36a of the cam stopper 63 out of the notch 29c formed in the clutch cam 29, so that the feed members 26 are pivoted from the position shown in FIG. 14a to the position shown in FIG. 14c through the position shown in FIG. 14b. This movement of the feed members 26 de-actuates switch LS3. At this time, the feed members 26 pull the card 1 out of the cassette by pushing the lugs 1a of the card 1 which is disposed in front of the feed members 26 after being guided by the separators 77.

At the same time, the hold-down rollers 45 carried by the support 48 are moved downwardly by the action of the cam 50 rotating with the clutch cam 29, so that the card pull on to the feed rollers 38 is held between the feed rollers 38 and the hold-down rollers 45. The card 1 is fed to a predetermined position, at a rate higher than the rate at which it is fed by the feed members 26, by the feed rollers 38 which starts rotating at the same time as the motor 11 is actuated. The hold-down rollers 45 are moved upwardly away from the feed rollers 38 by the action of the cam 50 before the feed members 36 reach a position at which they become stationary, so that the movement of the card 1 is interrupted. The distance covered by the card 1 fed as aforementioned is set such that it corresponds to the distance covered by the card before the leading end of the card reaches a card catcher of a microreader or the like.

Figure 14C:
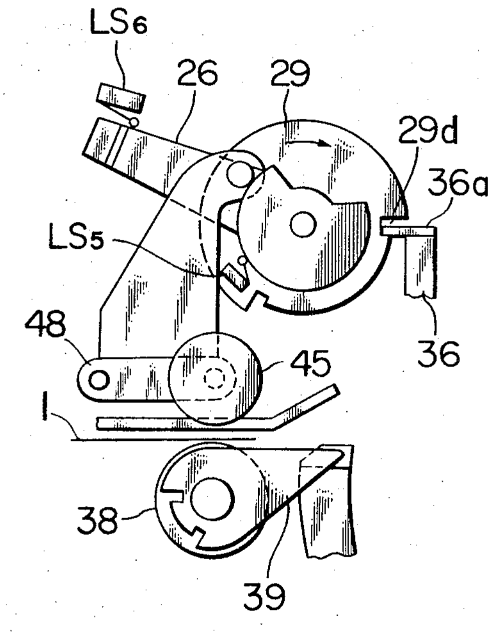
Figure 14B:
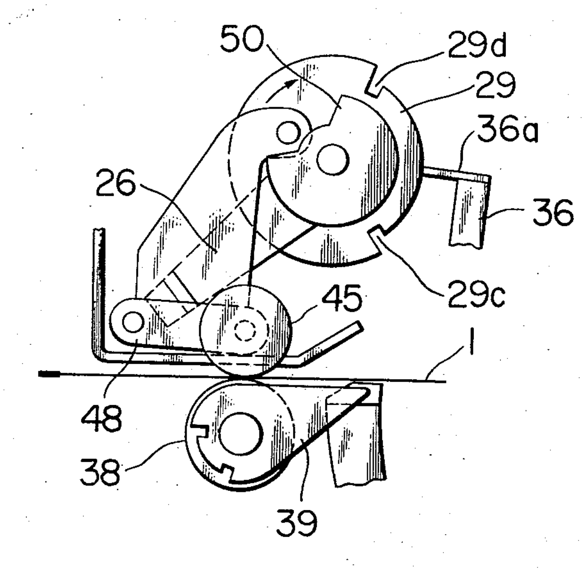

Further rotation of the clutch cam 29 brings the horizontal member 36a of the cam stopper 36 into engagement in the notch 29d formed in the cam clutch 29 as shown in FIG. 14c. At this time, the feed members 26 actuate switch LS5 and a suitable card catcher solenoid (not shown) is energized, so that the card can be positively caught and the cam clutch 29, cam 50 and feed members 26 are rendered inoperative. At the same time, the selection motor 11 stops rotating.

d. The withdrawn card is moved to a read-out station disposed elsewhere by conventional means (not shown). After being read, the card is returned to the withdrawing position.

e. The load switch (S3) is depressed. This rotates the selection motor 11 in the normal direction and energizes the solenoid 37 (SOL2).

The operation performed in withdrawing a card is reversed, and the support 48 moves downwardly as the clutch cam 29 rotates in the reverse direction to force the hold-down rollers 45 tightly over the feed rollers 38 with the card being held therebetween. Thus the feed rollers 38 rotate in the reverse direction to return the card. The feed rollers 38 rotate at high speed, so that the lugs of the card reach the position in which the hold-down rollers 45 engage the feed rollers 38 before the members 26 move downwardly. The hold-down rollers 45 are moved upwardly away from the feed rollers 38 by the support 48 before the feed members 26 reach the lugs of the card.

Figure 14D:
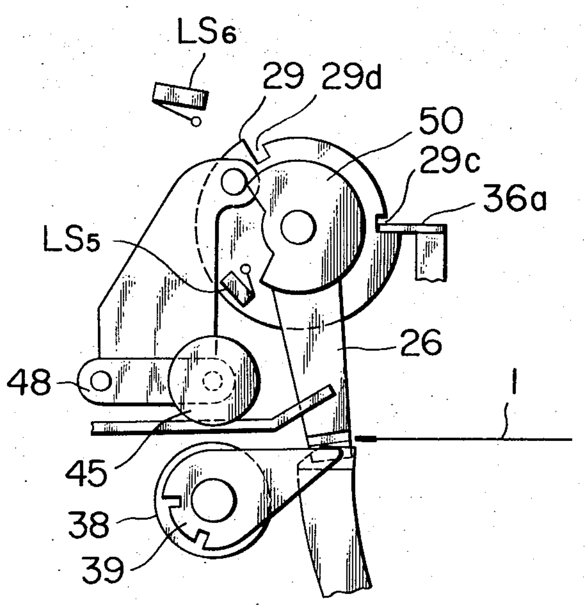
Figure 14E:
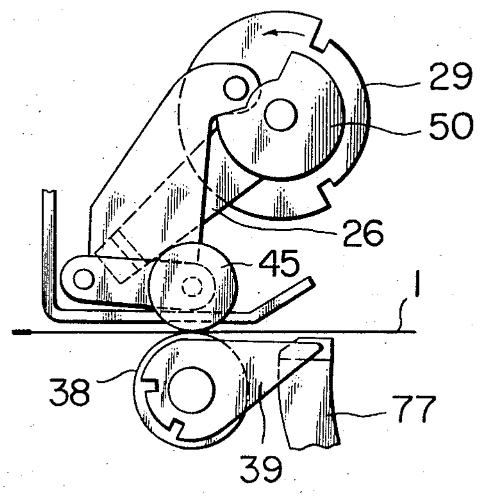

The feed members 26, moved downwardly by the rotating clutch cam 29 from the position shown in FIG. 14*c*, reach the position of the lugs of the card (immediately after reaching the position shown in FIG. 14*d*), and then return to the original starting position shown in FIG. 14*e* while pushing the lugs 1*a* of the card. They stop in the original starting position as the horizontal member 36*a* of the cam stopper 36 comes into engagement with the clutch cam 29. At this time, switch LS5 is actuated to interrupt rotation of the selection motor 11 (M2). The card is returned by the feed members 26 before the end surface of the card reaches the guide surfaces of the separators 77. The card is thus returned to the cassette 2.

When the selected card is fully withdrawn from the cassette and placed at the read-out station disposed elsewhere, a switch (LS7) is suitably actuated to render the cassette motor 8 (M1) operative to move the tray 3 downwardly in pivotal movement to a position in which switch TS3 is actuated so the card can be returned to the uppermost position on the pile of cards on the cassette 2. The aforementioned card returning operation is performed while the tray is in this lowermost position.

Upon completion of the card returning operation, the cassette motor 8 (M1) is actuated to move the tray 3 to its uppermost position in pivotal movement. The cassette 2 may be removed manually from the tray 3 in this position, thereby completing a cycle of the card selection and retrieval apparatus.

Card selection and retrieval can be performed not only automatically but also manually by the card selection and retrieval apparatus according to the invention. To this end, the guide members 39 are normally disposed in a position in which the triangular protruding portions are disposed in the position shown in FIG. 13*a* to permit a card to be guided to move smoothly into the tray 3 which is maintained, when standing by, in the uppermost position in which switch TS1 is actuated so as to permit the card guided by the guide members 39 to be inserted smoothly into a position on the bottom plate of the tray 3.

The feed members 26 functioning to withdraw a selected card from the tray 3 and to return the card to the tray after it is read are adapted to catch against and push the lugs of the card. When in the standby position, the feed members 26 may prevent manual insertion of a card because of the lugs of the card catching against the members 26. In order to obviate this disadvantage, each feed member 26 is bent at 26*a* as shown in FIG. 5 and FIG. 7 so as to form a guide surface in the same plane as the guide surface of each guide member 39 which is its upper surface.

According to the invention, the desired card is selected by the selector bars and pulled out by the withdrawing lever provided with magnets while the cassette is held in a forwardly inclined position. This facilitates withdrawing of the selected card because the card tends to move out of the cassette by gravity. Thus, the magnetic force required to pull out the card is very small. The magnetic force used for pulling out the desired card need not be great even if the cassette contains a large number of cards. Since the friction between the desired card to be withdrawn and the card overlying the desired cards have little effect on the force required to partly withdraw a selected card, it is possible to pull out the selected card positively and with relatively little force.

According to the invention, the selector bars in the ON position are locked when the desired card is pulled out. This keeps the selector bars from being moved by the card being pulled out even if the card is pulled with a great force by the withdrawing lever. This permits retrieval of the desired card to be effected positively. The force exerted on the selected card to pull it out of the cassette acts on the selector bars in a direction substantially parallel to the large surfaces of the selector bars. Thus, there is no tendency to bend the selector bars thereby.

According to the invention, the spring clutch means and cam clutch are actuated when the engaging portions cooperating therewith are pulled by the solenoids. The various switches are either turned ON or OFF when the engaging portions are brought into engagement in the notches, thus providing positive timing control. Limit switches are provided to ensure that various control switches are maintained in the appropriate OFF or ON position during the time the engaging portions are out of engagement in the notches and are sliding along the cam surfaces of clutch sleeve or clutch cam, and that the appropriate switches are turned ON or OFF respectively, when the engaging positions are brought into engagement in other notches. This eliminates the need to provide electronic timers and mechanically allows the associated parts to operate in proper synchronism with one another. The invented apparatus is therefore dependable in operation and low in cost.

I claim:

1. An information card selection and retrieval apparatus comprising:

- a cassette for containing a stack of information cards each having an edge coded with at least one notch and containing magnetic material, the coded edges of the cards facing in the same direction and protruding from the cassette;
- a tray for fixedly mounting the cassette and means for moving the tray pivotally about an axis parallel to the coded edges of the cards between a lowermost position at which the coded edges of the cards are at a lowermost position and are substantially lower than the opposite edges thereof and upper positions;
- a plurality of selector bars disposed to face the coded edges of the cards in the lowermost position of the tray, each selector bar movable between an ON position to abut said coded edges and an OFF position away from the coded edges, each selector bar being narrower than a notch;
- settable means for disposing at least one selector bar in its ON position;
- selector magnet means and means for moving the magnet means against the coded edges of the cards while the tray is in its lowermost position to couple magnetically with the magnetic material of the cards and for subsequently moving the magnet means away from the cassette to thereby move therewith to a selected position partly out of the

UNITED STATES PATENT OFFICE

CERTIFICATE OF CORRECTION

PATENT NO. : 3,866,755

DATED : Feb. 18, 1975

INVENTOR(S) : Nobuyuki Yanagawa

It is certified that error appears in the above-identified patent and that said Letters Patent are hereby corrected as shown below:

Title Page, Assignee should correctly read:

-- RICOH CO., LTD. --

Signed and sealed this 17th day of June 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

PATENT NO. : 3,866,755

DATED : Feb. 18, 1975

INVENTOR(S) : Nobuyuki Yanagawa

It is certified that error appears in the above-identified patent and that said Letters Patent are hereby corrected as shown below:

Title Page, Assignee should correctly read:

-- RICOH CO., LTD. --

Signed and sealed this 17th day of June 1975.

(SEAL)
Attest:

RUTH C. MASON
Attesting Officer

C. MARSHALL DANN
Commissioner of Patents
and Trademarks